US010650467B2

(12) United States Patent
Hoerle et al.

(10) Patent No.: US 10,650,467 B2
(45) Date of Patent: May 12, 2020

(54) SYSTEM AND METHOD FOR CALCULATING ESTIMATED PAYMENT BASED ON PARTIAL CODING DATA

(71) Applicant: Cognizant TriZetto Software Group, Inc., Englewood, CO (US)

(72) Inventors: Dale Hoerle, Gilbert, AZ (US); Debra Romig Nelson, Sharps Chapel, TN (US); Rachael Nadesda Mcalla Jones, West Orange, NJ (US)

(73) Assignee: Cognizant TriZetto Software Group, Inc., Denver, CO (US)

( * ) Notice: Subject to any disclaimer, the term of this patent is extended or adjusted under 35 U.S.C. 154(b) by 0 days.

(21) Appl. No.: 16/381,148

(22) Filed: Apr. 11, 2019

(65) Prior Publication Data

US 2019/0236714 A1    Aug. 1, 2019

Related U.S. Application Data

(63) Continuation of application No. 13/242,954, filed on Sep. 23, 2011, now Pat. No. 10,296,976.

(51) Int. Cl.
*G06Q 40/08* (2012.01)
*G06Q 10/10* (2012.01)

(52) U.S. Cl.
CPC ............ *G06Q 40/08* (2013.01); *G06Q 10/10* (2013.01)

(58) Field of Classification Search
CPC ........ G16H 15/00; G16H 50/30; G16H 10/60; G16H 50/20; G16H 40/63; G16H 10/40; G16H 30/40; G16H 50/70; G16H 20/10; G16H 20/40; G16H 20/60; G16H 40/20; G16H 40/67; G16H 10/20; G16H 50/50; G16H 30/20; G06Q 30/04; G06Q 40/08; G06Q 50/22; G06Q 50/24

See application file for complete search history.

(56) References Cited

U.S. PATENT DOCUMENTS

| | | | | |
|---|---|---|---|---|
| 2003/0191665 | A1* | 10/2003 | Fitzgerald | G06F 19/328 705/2 |
| 2008/0033750 | A1* | 2/2008 | Burriss | G06F 19/328 705/2 |

* cited by examiner

*Primary Examiner* — Joseph D Burgess
(74) *Attorney, Agent, or Firm* — Dawn-Marie Bey; Bey & Cotropia PLLC

(57) ABSTRACT

Processes for estimating payment on a claim for services rendered are described. The process includes formatting data related to a medical service to be rendered to a patient in a mock claim, applying pricing rules that are unique to an agreement between payer entity and a provider of the service; and determining an estimated payment for the medical service to be paid by the payer to the provider after the medical service has been rendered to the patient.

17 Claims, 3 Drawing Sheets

SYSTEM AND METHOD FOR CALCULATING ESTIMATED PAYMENT BASED ON PARTIAL CODING DATA

CROSS-REFERENCE TO RELATED APPLICATIONS

This application is a continuation of U.S. application Ser. No. 13/242,954, filed Sep. 23, 2011, and titled "SYSTEM AND METHOD FOR CALCULATING ESTIMATED PAYMENT BASED ON PARTIAL CODING DATA," the contents of which are incorporated herein by reference in its entirety.

The following commonly owned patents and applications are incorporated herein by reference in their entirety: U.S. Pat. No. 7,904,317 entitled "A NOVEL METHOD AND APPARATUS FOR REPRICING A REIMBURSEMENT CLAIM AGAINST A CONTRACT" issued Mar. 8, 2011; U.S. application Ser. No. 12/975,647 entitled "A NOVEL METHOD AND APPARATUS FOR REPRICING A REIMBURSEMENT CLAIM AGAINST A CONTRACT" a divisional of U.S. Pat. No. 7,904,317; U.S. application Ser. No. 10/965,673 entitled "SYSTEM AND METHOD FOR USING A FIRST ELECTRONIC REPRESENTATION OF CONTRACT TERMS FOR GENERATING A SECOND ELECTRONIC REPRESENTATION OF THE CONTRACT TERMS;" U.S. application Ser. No. 10/923,539 entitled "SYSTEM AND METHOD FOR MODELING TERMS OF A CONTRACT UNDER NEGOTIATION TO DETERMINE THEIR IMPACT ON A CONTRACTING PARTY;" and U.S. application Ser. No. 11/757,154 titled "ENHANCED SYSTEMS AND METHODS FOR PROCESSING OF HEALTHCARE INFORMATION" filed Jun. 1, 2007

BACKGROUND

Currently, there is a substantial lag between the time that services are provided to a patient by a provider, e.g., during an inpatient episode, and the time the provider is paid by a payer. Further there is often a fairly significant difference between an estimated cost for provider services, i.e., estimated accounts receivable (A/R), and what is actually reimbursed to the provider in response to a submitted claim. This lag and pay discrepancy results in accounting headaches and increased administrative expenditures to fix the providers books. Such expenditures are necessarily passed along to patients in the form of increased costs for services. These inaccuracies increase ten-fold when the provider is a hospital or similar network which contracts with multiple other providers (list) and multiple insurance earners, i.e., payers.

Accordingly, there is a need in the provider environment for the ability to more accurately estimate the A/R. Such a solution would allow the provider to gain an accurate view of A/R.

SUMMARY

In a first embodiment, a process for estimating payment on a claim for services rendered is described. The process includes: receiving by a processor at a first predetermined time a first data set from a provider including a first indicator of at least one medical service to be rendered to a patient and a second indicator identifying a payer entity which has agreed to pay for the at least one medical service, said first data set not including at least some data required to process an actual claim for the at least one medical service; formatting by a processor the first data set into an actual claim format to generate a first mock claim, the actual claim format being unique to the payer entity; retrieving by a processor pricing rules based on the second indicator identifying the payer entity, wherein the pricing rules are unique to an agreement between the payer entity and the provider; and applying by a processor the pricing rules to the first mock claim to determine a first estimated payment for the at least one medical service to be paid by the payer entity to the provider after the at least one medical service has been rendered to the patient.

In a second embodiment, a process for determining estimated payment on a claim for services rendered is described. The process includes: generating by a processor at a first time a first mock claim in an actual claim format using a first data set including a first indicator of at least one medical service to be rendered to a patient and a second indicator identifying a payer entity which has agreed to pay for the at least one medical service, said first data set not including at least some data required to process an actual claim for the at least one medical service; submitting by a processor the first mock claim to a pricing application; and accessing a first estimate of payment for the at least one medical service based on the first mock claim.

In a third embodiment, a process for estimating payment on a claim for services rendered is described. The process includes: generating by a processor at a first time a first mock claim in an actual claim format at a provider using a first data set including a first indicator of at least one medical service to be rendered to a patient at the provider and a second indicator identifying a payer entity which has agreed to pay for the at least one medical service; retrieving by a processor pricing rules based on the second indicator identifying the payer entity, wherein the pricing rules are unique to an agreement between the payer entity and the provider; and applying by a processor the pricing rules to the first mock claim to determine a first estimated payment for the at least one medical service to be paid by the payer entity to the provider after the at least one medical service has been rendered to the patient.

BRIEF DESCRIPTION OF FIGURES

The following figures are supporting disclosure and intended to be considered in conjunction with the description herein.

DETAILED DESCRIPTION

In conjunction with the figures, the following describes embodiments of a system and process for determining payment due estimates for services provided as part of a patient episode prior to formal submission of one or more claims to a payer for payment related to the patient episode.

Figure 1:
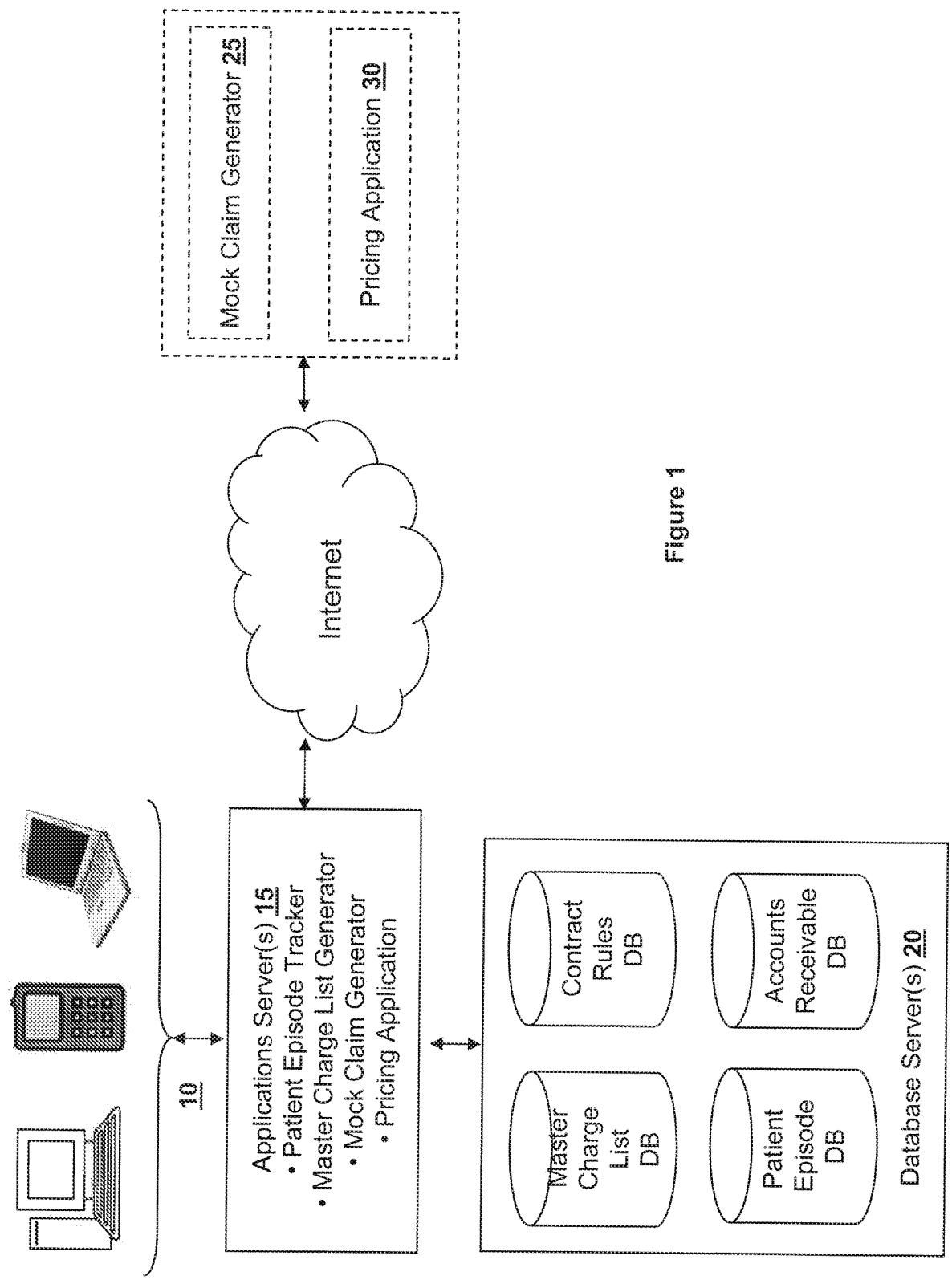
FIG. 1 is an exemplary system for executing the processes as described.

More particularly, referring to FIG. 1, exemplary systems for implementing the process described herein include an internal network including data input devices 10a-10c; application servers 15 for facilitating data processing as described herein; and database servers 20 for storing data for processing. A mock claim generator 25 and pricing application are shown at 30 as being accessible via an external network, e.g., the internet, separate from the networked components 10a-10c; 15 and 20, but could instead be one of the numerous applications hosted on the network at 15. Similarly, other applications described herein could be accessed and run outside of the network, e.g., by third-party service providers.

As shown, for a specific implementation of the process described herein, the internal network is a hospital or hospital system network. More particularly, the system includes certain databases of information and applications that are used by institutions such as hospitals to provide services to patients. Such services are generally more involved than single service visits to a doctor. Further, an inpatient episode at a hospital often is a combination of multiple services performed over a period of time. Accordingly, hospitals populate and maintain master charge lists (also called chargemasters or charge description masters (CDM)) which price individual services and supplies that may be used during inpatient episodes. Additionally, hospitals track individual patient episodes as they unfold, adding services and supplies as they are provided/used. Either as part of the patient episode or as part of a separate accounts receivable data store, the hospital maintains a running total of the overall cost for the individual patient episodes.

Separately, hospitals negotiate and maintain numerous contracts with various payers, e.g., insurance companies. The negotiated terms of these contracts can and often do vary from payer to payer and even with the same payer depending on certain circumstances, and almost always, when applied during adjudication of the patient episode claim(s) by the payer, result in a substantial deviation from the costs estimated by the hospital using the hospital's master charge list. That is, the amount calculated using the hospital's master charge list for services and supplies is nearly always significantly higher than what the hospital will ultimately be paid by the payer(s) for those services and supplies. The master charge lists contains data including a unique number (could be alphanumeric) for referencing the transaction or charge description for each procedure, supply or service. This transaction identifier is sometimes referred to as a charge description number, an item code or a CDM number/code. The transaction identifiers may be diagnosis codes, e.g., ICD (International Statistical Classification of Diseases and Related Health Problems; prior or current versions, e.g. ICD9, ICD10) codes; procedure codes in accordance with Current Procedural Terminology (CPT), Healthcare Common Procedure Coding System (HCPCS); and other recognized codes for identifying a procedure, supply or service or grouping of such.

The master charge lists also include item descriptors, i.e., a description of the procedure, supply or service. Associated with each procedure, supply or service is a revenue or billing code. The revenue codes may vary across payers. Generally, revenue codes are used along with procedure, supply or service codes to further identify where the procedure, supply or service was preformed/used, e.g., emergency room, treatment room, clinic, etc., and to further describe the exact nature of the treatment. For example, the revenue code for supplies is 27x, wherein x can further be defined using 0 to 9 to specify supplies in an appropriate subcategory as follows:

271—Nonsterile Supply
272—Sterile Supply
273—Take-Home Supply
274—Prosthetic/Orthotic Devices
275—Pacemaker
276—Intraocular Lens
277—Oxygen Take-Home
278—Other Implants
279—Other Supplies/Devices Additional descriptive information about revenue codes can be found in the Mitchell, et al., article "Billing For Inpatient Hospital Care," Am. J. Health-Syst. Pharm., Vol. 60, Nov. 1, 2003, Suppl. 6, which is incorporated herein by reference. The master charge list also includes a charge or price amount of each procedure, supply or service. As discussed above, this charge or price amount on the master charge list is not indicative of what will actually be reimbursed for the procedure, supply or service by a payer(s). Further, currently, for many procedures, supplies or services, there is no set formula for setting the master charge list charge amounts. Instead, the individual hospitals must calculate in accordance with their individual costs; marking up to cover expenses.

Under current systems, the hospital keeps an internal running total and inventory for each procedure, supply or service that it is providing to each patient in accordance with the hospitals master charge list. At the end of the patient episode, a claim form is prepared, usually in accordance with the requirements of one of the Uniform Billing Forms, e.g., UB-04, CMS-1500 (Centers for Medicare and Medicaid Services), the Health Care Finance Administration Billing Form Number 1500 (HCFA 1500) or electronic formats such as ANSI X.12 5010, with certain variations as required by individual non-government payers. The completed form will include, in accordance with services provided, the characteristics related to the individual services provided, including but not limited to the reason and date of admission, condition codes, occurrence codes, revenue codes, as well as payer information. A standard UB-92 form allows for multiple ICD codes and procedure codes. The completed form is forwarded to the payer (or payer processing entity) for adjudication at the end of the patient episode.

Payers and hospitals/providers generally establish contracts at a summary level, as compared to the detailed, itemized level of the master charge list. In accordance with the exemplary embodiment, the negotiated contracts between a provider and payer are represented in the form of rate sheets. The rate sheet includes pricing terms that have been agreed to by the provider and the payer. The terms are represented by combining qualifiers and calculations. Qualifiers are industry codes, e.g., diagnosis and procedure codes, grouped together to define specific type of patient episode. Qualifiers may be based on pre-existing coding indices, such as Medicare's diagnosis related group (DRG) codes, ambulatory payment classification (APC) or other defined groupings of services and supplies that comprise a patient episode. The groupings could also be separately determined by the provider and payer. Calculations are arithmetic computations, values or weights applied to the qualifier to arrive at the negotiated case-based payment that the payer is willing to pay for the patient episode. Table 1 below exemplifies qualifiers and calculations as they could be presented in a negotiated contract. As described in U.S. Pat. No. 7,904,317 entitled "A NOVEL METHOD AND APPARATUS FOR REPRICING A REIMBURSEMENT CLAIM AGAINST A CONTRACT", which is incorporated herein by reference in its entirety, contract terms may be electronically represented by associating with each term information representing at least one qualifier having a corresponding calculation method. The qualifier identifies a condition that, if met in the claim, triggers the corresponding calculation method.

TABLE 1

| Term | Qualifier | Calculation Method |
| --- | --- | --- |
| Chemotherapy Treatment Case Rate | DRG Code 410 | Pricing is a case rate of $6000 for up to 15 days and $1500 per day for each additional day. Limit the allowed to be the lesser of the discounted rate or charges on the bill. |
| ICU/CCU Per diem | Any Revenue codes with values of 200 through 219 | Pricing is a per diem of $1400 per day. |

Figure 2:
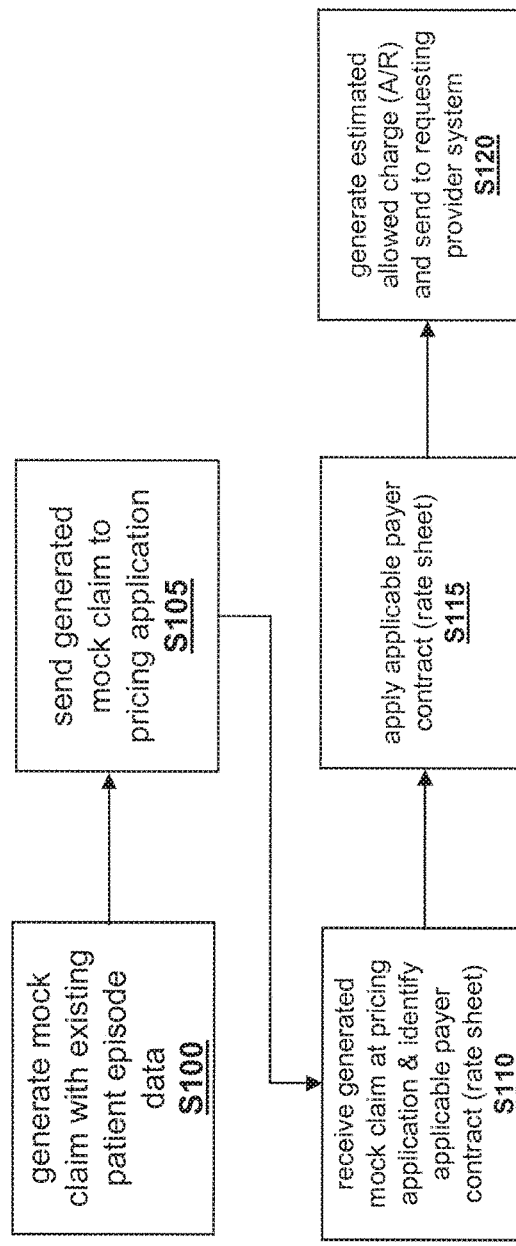
FIG. 2 is an exemplary process flow in accordance with one or more embodiments.

Referring to FIG. 2, in accordance with a first exemplary embodiment, the individual patient episode data generated by the patient episode tracker, e.g., services and supplies, for an individual patient episode, is formatted into a standardized mock claim form by the mock claim generator application S100. The mock claim forms can be similar to the Uniform Billing Forms, e.g., UB-04, CMS-1500 (Centers for Medicare and Medicaid Services), the Health Care Finance Administration Billing Form Number 1500 (HCFA 1500) or electronic forms such as ANSI X.12 5010 currently used as the basis for actual claim submission for adjudication. The mock claim process could be similar to that described in co-pending U.S. application Ser. No. 11/757,154 titled "ENHANCED SYSTEMS AND METHODS FOR PROCESSING OF HEALTHCARE INFORMATION" filed Jun. 1, 2007, which is incorporated herein by reference. The patient episode data stored by the hospital includes every detailed charge to date for the patient from individual supplies used to medications to actual procedure charges for doctors. As discussed above, each of these individual charges is stored and cross-referenced to identifying codes in the hospital's master charge list. These identifying codes are used to populate the mock claim form. Additionally, as part of the generation of the mock claim, the mock claim generator application may add certain default codes or information into the mock claim form as need for the pricing engine to ascertain the applicable payer contract.

As discussed with reference to FIG. 1, this mock claim generation step could be performed in the hospital network and the mock claim is then sent to the pricing application (S105) or the raw patient episode data could be provided from the hospital network to a third-party service provider through, e.g., a web service call, and the mock claim generation would not be done by the provider/hospital. The mock claim generation could be performed by a third party separate and apart from the hospital/provider or the pricing entity, e.g., the third party could be a clearinghouse. The information from the individual patient episode includes information that allows the application servers 15 to identify the correct payer contract and extract applicable contract rules from the database (S110). The application servers 15 include business logic to identify the patient's network based on, for example, the patient's member identification (ID) or group information, if the network is not known at admission. Once the network is known, the application servers 15 can derive the appropriate contract to use for pricing. The mock claim is then priced in accordance with applicable contract rules by the pricing application to calculate for the hospital the estimated receivable and the results are provider or made available to the requesting provider (S115, S120). The results may be returned via a web service call or viewable through a web portal or made available through other secure systems and processes recognizable to one skilled in the art.

In most instances, very early in the patient episode, data is provided that allows the pricing application to price the entire patient episode. For example, initial diagnosis codes, which are provided in advance or in conjunction with admittance, are often sufficient to identify a patient bundle in its entirety; well before the episode is complete. Accordingly, by way of particular example, a patient is admitted for a scheduled heart transplant which will require a 10 day hospital stay. Under the applicable payer contract, the hospital will be reimbursed at a predetermined case rate for the entire patient episode. At the end of the patient's first day, the patient episode data includes various pre-operation charges and the diagnosis code and/or other information or codes that identify that this patient episode is a heart transplant. Even with this limited patient episode data, the mock claim generator can generate a mock claim with the appropriate entries to identify the heart transplant and the pricing application is able to estimate the applicable case rate at the end of the first day of admission. Accordingly, the hospital knows well in advance of the completion of the patient episode what should be paid by the payer once the patient episode is complete and the actual claim is submitted to the payer for adjudication. As the patient episode unfolds, the hospital will continue to add line items to the patient episode data to track all supplies, procedures, services as they are provided. Each time the process described herein is run, e.g., at the end of each day, a mock claim is generated using the available patient episode data as described with respect to FIG. 2. In this particular example, the estimated payment amount could be the same, regardless of how much detail is added to the mock claim, since the applicable contract is going to pay a set case rate. Alternatively, the applicable contract could include a provision wherein should something out of the ordinary happen during the patient episode, the case rate is no longer applicable or is no longer the entirety of the payment. This will be reflected in the patient episode data and the mock claim and the estimated payment is adjusted when the contract term is triggered.

Figure 3:
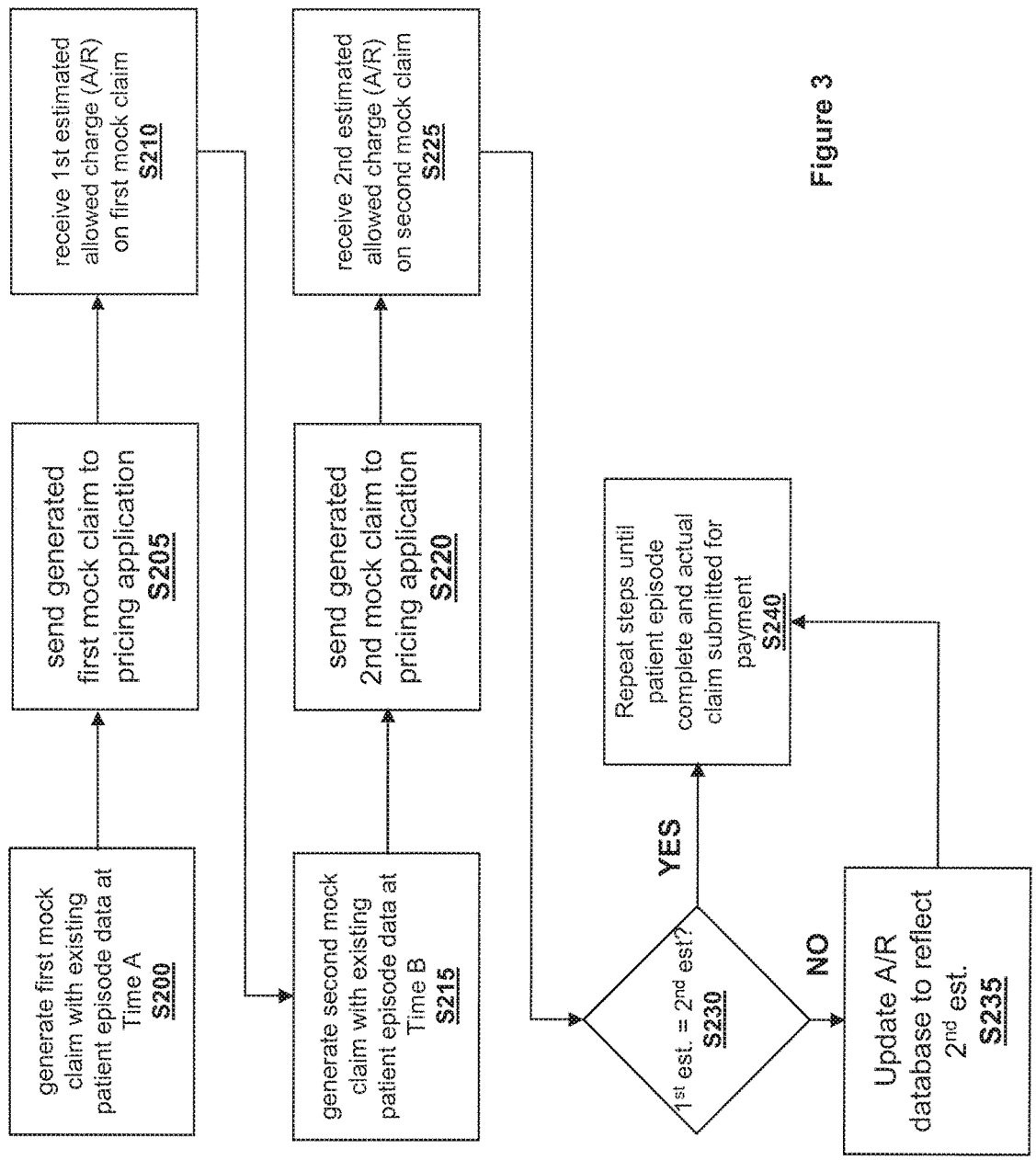
FIG. 3 is an exemplary process flow in accordance with one or more embodiments.

Referring to FIG. 3, an exemplary process is described wherein the A/R database at the hospital/provider is updated on a continual basis as new patient episode data is added. As exemplified, a first mock claim is generated using existing patient episode data by a processor at Time A S200, this first mock claim is sent to the pricing application S205, and the first estimated allowed charge (A/R) on the first mock claim is received S210. At a later Time B, which could either be regularly scheduled (e.g., end of day) or triggered by addition of a new entry to the patient episode data or on-demand, a second mock claim is generated using existing patient episode data by a processor S215, this second mock claim is sent to the pricing application S220, and the second estimated allowed charge (A/R) on the second mock claim is received S225. The first estimate and second estimate are compared S230 and an A/R database is updated to reflect any changes S235. The mock claim generation, submission and database updating processes are repeated until the patient episode is complete and the actual claim is submitted to the payer for payment S240.

The processes described here can be repeated across all active patient episodes on a predetermined schedule, e.g., end of day or some other time period, or on demand. Accordingly, the hospital/provider is able to more accurately track A/R across patient episodes and payers during the patient episode, instead of basing the estimate on an inaccurate master charge list. The ability to view and analyze patient episode estimates during and shortly after the closing of an episode and before submission of the claim or claims related to the episode for adjudication affords the hospital the opportunity to make revisions, if necessary, prior to committing for adjudication and payment. For example, the A/R estimate could be so far off from expectations that the hospital is alerted to this fact by the pricing application. This process can be used to fix coding errors prior to submission of the actual claim for adjudication by the payer. Presently, claims frequently must be submitted numerous times because they are rejected by payer adjudication systems due to missing or inaccurate entries. The system described herein establishes a de facto pre-approval, feedback process whereby the hospital can correct errors on an ongoing basis and receive a fairly accurate accounting of what the hospital should expect to be paid for the patient episode. Further, post-payment, the system and process described here can be used to validate the allowed amount for the actual claim calculated by the payer.

Additionally, the ability to track how and when estimates change during a patient episode is useful for determining when to start or stop a patient episode and how much to charge for the patient episode when re-negotiating existing payer contracts or negotiating contracts with new payers. Further, pursuant to U.S. Pat. No. 7,904,317 entitled "A NOVEL METHOD AND APPARATUS FOR REPRICING A REIMBURSEMENT CLAIM AGAINST A CONTRACT" issued Mar. 8, 2011; U.S. application Ser. No. 12/975,647 entitled "A NOVEL METHOD AND APPARATUS FOR REPRICING A REIMBURSEMENT CLAIM AGAINST A CONTRACT" a divisional of U.S. Pat. No. 7,904,317; U.S. application Ser. No. 10/965,673 entitled "SYSTEM AND METHOD FOR USING A FIRST ELECTRONIC REPRESENTATION OF CONTRACT TERMS FOR GENERATING A SECOND ELECTRONIC REPRESENTATION OF THE CONTRACT TERMS;" and U.S. application Ser. No. 10/923,539 entitled "SYSTEM AND METHOD FOR MODELING TERMS OF A CONTRACT UNDER NEGOTIATION TO DETERMINE THEIR IMPACT ON A CONTRACTING PARTY which are incorporated herein by reference, the processes described herein can aid a provider by modeling various claim scenarios against known contract terms to determine outcome.

In implementing these systems and methods to be performed by a suitably programmed computer, it is intended that the computer have a processor and a computer readable medium, wherein the computer readable medium has program code. The program code can be made of one or more modules that carry out instructions for implementing the systems and methods herein. The processor can execute the instructions as programmed in the modules of the program code.

The systems and methods described can be implemented as a computer program product having a computer readable medium having a computer readable program code embodied therein, the computer readable program code adapted to be executed to implement a method for performing the methods described above. Each step or aspect can be performed by a different module, or a single module can perform more than a single step.

The systems and methods described herein as software can be executed on at least one server, though it is understood that they can be configured in other ways and retain its functionality. The above-described technology can be implemented on known devices such as a personal computer, a special purpose computer, cellular telephone, personal digital assistant (PDA), a programmed microprocessor or microcontroller and peripheral integrated circuit element(s), and ASIC or other integrated circuit, a digital signal processor, a hard-wired electronic or logic circuit such as a discrete element circuit, a programmable logic device such as a PLD, PLA, FPGA, PAL, or the like. In general, any device capable of implementing the processes described herein can be used to implement the systems and techniques according to this invention.

It is to be appreciated that the various components of the technology can be located at distant portions of a distributed network and/or the Internet, or within a dedicated secure, unsecured and/or encrypted system. Thus, it should be appreciated that the components of the system can be combined into one or more devices or co-located on a particular node of a distributed network, such as a telecommunications network. As will be appreciated from the description, and for reasons of computational efficiency, the components of the system can be arranged at any location within a distributed network without affecting the operation of the system. Moreover, the components could be embedded in a dedicated machine.

Furthermore, it should be appreciated that the various links connecting the elements can be wired or wireless links, or any combination thereof, or any other known or later developed element(s) that is capable of supplying and/or communicating data to and from the connected elements. The term module as used herein can refer to any known or later developed hardware, software, firmware, or combination thereof that is capable of performing the functionality associated with that element. The terms determine, calculate and compute, and variations thereof, as used herein are used interchangeably and include any type of methodology, process, mathematical operation or technique.

Moreover, the disclosed methods may be readily implemented in software, e.g., as a computer program product having one or more modules each adapted for one or more functions of the software, executed on a programmed general purpose computer, cellular telephone, PDA, a special purpose computer, a microprocessor, or the like. In these instances, the systems and methods of this invention can be implemented as a program embedded on a personal computer such as a JAVA®, CGI or Perl script, as a resource residing on a server or graphics workstation, as a routine embedded in a dedicated image system, or the like. The systems and methods of this invention can also be implemented by physically incorporating this system and method into a software and/or hardware system, such as the hardware and software systems of a computer. Such computer program products and systems can be distributed and employ a client-server architecture.

The embodiments described above are intended to be exemplary. One skilled in the art recognizes that numerous alternative components and embodiments that may be substituted for the particular examples described herein and still fall within the scope of the invention.

We claim:

1. A process for automatically calculating payment due for a completed patient episode on an on-going basis as individual services provided as part of the patient episode are performed and prior to submission of one or more claims to one or more payers for adjudication and determination of one or more payments due related to the patient episode for services rendered comprising:

receiving by a mock claim generator application at a first predetermined time a first data set from a provider including a first indicator of a first at least one medical service to be rendered to a patient as part of the patient episode and a second indicator identifying a payer entity which has agreed to pay for the first at least one medical service as part of the one or more payments due related to the patient episode, said first data set not including at least some data required to adjudicate an actual claim for the patient episode including the first at least one medical service as part of the one or more payments due related to the patient episode;

formatting by the mock claim generator application the first data set into an actual claim format to generate a first mock claim, the actual claim format being unique to the payer entity and submitting the first mock claim at the first predetermined time to a pricing engine;

retrieving by the pricing engine pricing rules based on the second indicator identifying the payer entity, wherein the pricing rules are unique to an agreement between the payer entity and the provider of the patient episode; and applying by the pricing engine the pricing rules to the first mock claim to calculate a first estimated payment for the completed patient episode based on the first at least one medical service to be paid by the payer entity to the provider after completion of the patient episode, including performance of all individual services provided as part of the patient episode and submission of an actual claim for the patient episode for adjudication;

receiving by the mock claim generator application at a second predetermined time a second data set from the provider including the first indicator, the second indicator and at least a third indicator related to a second at least one medical service to be rendered to the patient provided as part of the patient episode, said second data set not including at least some data required to adjudicate an actual claim for the patient episode including the first and second at least one medical services as part of the one or more payments due related to the patient episode;

automatically triggering, based on receipt of the third indicator, the mock claim generator application to format the second data set into a second mock claim using the actual claim format and submitting the first mock claim at the second predetermined time to the pricing engine;

retrieving by the pricing engine pricing rules based on the second indicator identifying the payer entity; and applying by the pricing engine the pricing rules to the second mock claim to determine a second estimated payment for the completed patient episode based on the first at least one medical service and the second at least one medical service to be paid by the payer entity to the provider after completion of the patient episode, including performance of all individual services provided as part of the patient episode and submission of an actual claim for the patient episode for adjudication.

2. The process according to claim 1, wherein the first indicator is selected from the group consisting of a diagnosis code, a diagnosis-related group (DRG) code, ambulatory payment classification (APC), a revenue code or a procedure code.

3. The process according to claim 1, wherein the actual claim format is selected from the group consisting of Uniform Billing Form UB-04, CMS-1500, the Health Care Finance Administration Billing Form Number 1500 (HCFA 1500) and ANSI X.12 5010 form.

4. The process according to claim 1, wherein the second indicator is a patient identifier (ID).

5. The process according to claim 1, wherein the at least a third indicator is selected from the group consisting of a diagnosis code, a diagnosis-related group (DRG) code, ambulatory payment classification (APC), a revenue code or a procedure code.

6. The process according to claim 1, wherein the first indicator is a diagnosis code or a procedure code, the second indicator is a patient identifier (ID) and the third indicator is selected from the group consisting of a procedure code or a supply code.

7. A process for determining estimated payment on a claim for services rendered comprising:

generating by a mock claim generator application at a first time a first mock claim in an actual claim format using a first data set including a first indicator of at least one medical service to be rendered to a patient and a second indicator identifying a payer entity which has agreed to pay for the at least one medical service, said first data set not including at least some data required to process an actual claim for the at least one medical service;

submitting the first mock claim to a pricing engine application; and accessing from the pricing engine application a first estimate of payment for the at least one medical service based on the first mock claim;

generating by the mock claim generator application at a second time a second mock claim in an actual claim format using a second data set including the first indicator, the second indicator and at least a third indicator related to the at least one medical service to be rendered to the patient, wherein generation of the second mock claim is specifically triggered by receipt of the third indicator;

submitting the second mock claim to a pricing application;

accessing from the pricing engine application a second estimate of payment for the at least one medical service based on the second mock claim; and comparing by a processor the first estimate and the second estimate and updating an accounts receivable database to reflect changes.

8. The process according to claim 7, wherein the first indicator is selected from the group consisting of a diagnosis code, a diagnosis-related group (DRG) code, ambulatory payment classification (APC), a revenue code or a procedure code.

9. The process according to claim 7, wherein the actual claim format is selected from the group consisting of Uniform Billing Form UB-04, CMS-1500, the Health Care Finance Administration Billing Form Number 1500 (HCFA 1500) and ANSI X.12 5010 form.

10. The process according to claim 7, wherein submitting the first mock claim is via a web-service call.

11. The process according to claim 7, wherein the second indicator is a patient identifier.

12. The process according to claim 7, wherein the at least a third indicator is selected from the group consisting of a diagnosis code, a diagnosis-related group (DRG) code, ambulatory payment classification (APC), a revenue code or a procedure code.

13. The process according to claim 7, wherein the first indicator is a diagnosis code or a procedure code, the second indicator is a patient identifier (ID) and the third indicator is selected from the group consisting of a procedure code or a supply code.

14. A process for estimating payment on a claim for services rendered comprising:

generating by a mock claim generator application at a first time a first mock claim in an actual claim format at a provider using a first data set including a first indicator of at least one medical service to be rendered to a patient at the provider and a second indicator identifying a payer entity which has agreed to pay for the at least one medical service;

retrieving by a pricing engine application pricing rules based on the second indicator identifying the payer entity, wherein the pricing rules are unique to an agreement between the payer entity and the provider; and applying by the pricing engine application the pricing rules to the first mock claim to determine a first estimated payment for the at least one medical service to be paid by the payer entity to the provider after the at least one medical service has been rendered to the patient;

generating by the mock claim generator application at a second time a second mock claim in an actual claim format at the provider using a second data set including the first indicator, the second indicator and at least a third indicator related to the at least one medical service to be rendered to the patient, wherein generation of the second mock claim is specifically triggered by receipt of the third indicator;

applying by the pricing engine application the pricing rules to the second mock claim to determine a second estimated payment for the at least one medical service to be paid by the payer entity to the provider after the at least one medical service has been rendered to the patient;

comparing by a processor the first estimate and the second estimate and updating an accounts receivable database to reflect changes in an estimated payment to be paid by the payer entity to the provider after the at least one medical service has been rendered to the patient.

15. The process according to claim 14, wherein the first indicator is selected from the group consisting of a diagnosis code, a diagnosis-related group (DRG) code, ambulatory payment classification (APC), a revenue code or a procedure code.

16. The process according to claim 14, wherein the second indicator is a patient identifier.

17. The process according to claim 14, wherein the at least a third indicator is selected from the group consisting of a diagnosis code, a diagnosis-related group (DRG) code, ambulatory payment classification (APC), a revenue code or a procedure code.

* * * * *